United States Patent [19]

Floyd

[11] 4,195,152
[45] Mar. 25, 1980

[54] N-ALKYL POLYAMINES AND CURING OF EPOXY RESINS THEREWITH

[75] Inventor: Don E. Floyd, Minneapolis, Minn.

[73] Assignee: Henkel Corporation, Minneapolis, Minn.

[21] Appl. No.: 926,363

[22] Filed: Jul. 20, 1978

Related U.S. Application Data

[62] Division of Ser. No. 821,014, Aug. 1, 1977, Pat. No. 4,126,640.

[51] Int. Cl.² ............................................. C08L 63/00
[52] U.S. Cl. ....................................... 528/87; 528/98; 528/99; 528/101; 528/106; 528/405; 528/407
[58] Field of Search ................... 528/87, 98, 99, 101, 528/106, 407, 405

[56] References Cited

U.S. PATENT DOCUMENTS

| | | | |
|---|---|---|---|
| 2,876,236 | 3/1959 | Szabo et al. | 260/583 P |
| 3,223,695 | 12/1965 | Gallaugher | 526/6 |
| 3,280,074 | 10/1966 | McCaleb et al. | 260/583 P |
| 3,291,775 | 12/1966 | Holm | 260/47 CZ |
| 3,321,438 | 5/1967 | Brooker et al. | 528/407 |
| 3,519,603 | 7/1970 | Lohse et al. | 528/407 |
| 3,763,102 | 10/1973 | Hoffmann et al. | 528/407 |

*Primary Examiner*—Maurice J. Welsh
*Attorney, Agent, or Firm*—Patrick J. Span; Elizabeth Tweedy; Forrest L. Collins

[57] ABSTRACT

There is disclosed a class of N-alkylpolyamines and their use as curing agents for epoxy resins, and in particular to such polyamines having the formula R—[NH(CH$_2$)$_x$]$_y$—NHR' where R is an aliphatic hydrocarbon radical having from 5 through 8 carbon atoms, R' is H, R or R'', x is an integer of 2 or 3 and y is an integer of 2-4. A monoepoxide adduct of the monoalkyl substituted polyamine is also disclosed wherein R'' may then become an aliphatic substituent (2-14 carbon atoms) which may contain (a) an oxygen atom, (b) a hydroxyl group or (c) an aromatic substituent such as a phenyl ring.

8 Claims, No Drawings

N-ALKYL POLYAMINES AND CURING OF EPOXY RESINS THEREWITH

This application is a division of application Ser. No. 821,014, filed Aug. 1, 1977 and now U.S. Pat. No. 4,126,640.

BACKGROUND OF THE INVENTION

This invention relates to N-alkylpolyamines of the formula R—[NH(CH$_2$)$_x$]$_y$—NHR', and their use as curing agents for epoxy resins, where R is an aliphatic, hydrocarbon radical of from 5 through 8 carbon atoms, R' is H, R or R'', x is an integer of 2 or 3 and y is an integer of 2 through 4. A monoepoxide adduct of the monoalkyl substituted polyamide is also disclosed wherein R'' may then become an aliphatic substituent (2–14 carbon atoms) which may contain (a) an oxygen atom, (b) a hydroxyl group or (c) an aromatic substituent such as a phenyl ring.

It is known that epoxy resins having more than one oxirane group per molecule, can be cured with a wide variety of polyfunctional compounds to hard, insoluble and infusible products having many practical uses, including coatings and adhesives. One general text relating thereto is "Epoxy Resins, Their Application and Technology", by Henry Lee and Kris Neville, McGraw, Hill Book Company, Inc. copyright 1957.

Among the various curing agents are the aliphatic alkylene polyamines, such as diethylene triamine and triethylene tetramine. Because of certain limitations such polyamines have been used in modified forms, such as alkyl derivatives. Thus, on page 70 of the Lee and Neville text, there is disclosed a modified diethylene triamine in which one of the primary amine groups is substituted with a 12 carbon atom aliphatic chain. This compound is also described in a Monsanto data sheet dated Feb. 24, 1955 as a C$_{12}$ aliphatic substituted diethylene triamine.

U.S. Pat. No. 3,291,775 discloses a process of curing polyepoxides with a polyimine or ketimines, such as those obtained by reacting a ketone with a polyamine. The products are exemplified therein by the formula

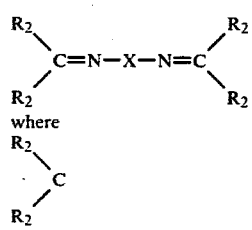

where is the residue from a ketone. Such compounds, on exposure to moisture, decompose to form the original ketone and polyamine which, accordingly, cures in the same manner as the polyamine itself with the volatile ketone being evolved. The products are, accordingly, subject substantially to the same limitation as in the polyamine itself.

U.S. Pat. No. 3,280,074 discloses a curing agent such as a monotertiary-diprimary triamine which is similar to the Amine ODT noted above but having an aliphatic hydrocarbon radical of 12–22 carbon atoms substituted on the middle nitrogen of diethylene triamine so that the secondary nitrogen of the diethylene triamine is converted to a tertiary nitrogen.

SUMMARY OF THE INVENTION

The present invention is concerned with certain N-alkyl polyamines of the formula R—[NH(CH$_2$)$_x$]$_y$—NHR', and their use as curing agents for epoxy resins, where R is an aliphatic hydrocarbon radical having from 5–8 carbon atoms, x is an integer of 2 or 4, y is an integer of 2–4 and R' is H, R or R'' where R'' is an aliphatic hydrocarbon substituent having 2–14 carbon atoms with the proviso that R'' may (a) contain an oxygen atom in the chain, (b) contain a hydroxyl substituent, (c) contain a phenyl substituent, or (d) contain any combination of (a), (b) and (c). Preferably R contains 6 or 7 carbon atoms.

While the curing agents are well suited for high solids coatings because of their very low viscosity, they may also be used for potting compositions, laminations and adhesives. In addition to their low viscosity which provides for ease in mixing with epoxy resins, other important characteristics of these curing agents are:

1. Low level of primary amine content because of N-alkyl substituent. This improves control over pot life and also minimizes deleterious action of carbon dioxide from the air. There is no more than one primary amino group per molecule.
2. Low viscosity makes possible coating formulas of low volatile solvent content. Thus, there is less waste of valuable solvent and, consequently, of the energy going into manufacture of the solvent. Furthermore, less volatile solvent is released to the atmosphere with subsequent reduction in air pollution by solvents. In addition, high solids in coating formulas make possible thicker films "in one pass", with resulting saving in cost of application.
3. The alkyl substituents reduce volatility and raise boiling point of the polyamine. Odor level is thus reduced and evaporation of curing agent from the surface of the coating film during cure is minimized.
4. The N-alkyl substituted polyamines are almost colorless. This is almost always an advantage for any kind of application.

DESCRIPTION OF PREFERRED EMBODIMENTS

The curing agents of the formula above are prepared by reacting a polyamine with a ketone to provide a ketimine followed by reduction of the ketimine to the N-alkyl substituted polyamine, preferably by catalytic hydrogenation. The polyamine may be represented by the formula corresponding to that noted above for the N-alkyl polyamine but where R and R' are H, such as, H[NH(CH$_2$)$_x$]$_y$—NH$_2$ where x and y are as defined earlier. Illustrative of such polyamines are diethylene triamine, dipropylene triamine, triethylene tetramine, and tetraethylene pentamine.

The ketones employed in this invention are aliphatic ketones, which may have straight or branched chains, and contain a total of 5 through 8 carbon atoms. Such ketones may be represented by the formula

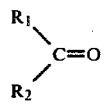

where $R_1$ and $R_2$ are selected from the group consisting of aliphatic hydrocarbon radicals having from 1-6 carbon atoms, with the total carbon atom in said ketone being from 5-8 carbon atoms. The preferred ketones, which are also readily available, are those where $R_1$ is methyl and $R_2$ is an aliphatic hydrocarbon radical containing 4-5 carbon atoms such as isoamyl, isobutyl, and butyl.

The reaction may be represented by the following equations, as illustrated with diethylene triamine and methyl isobutyl ketone:

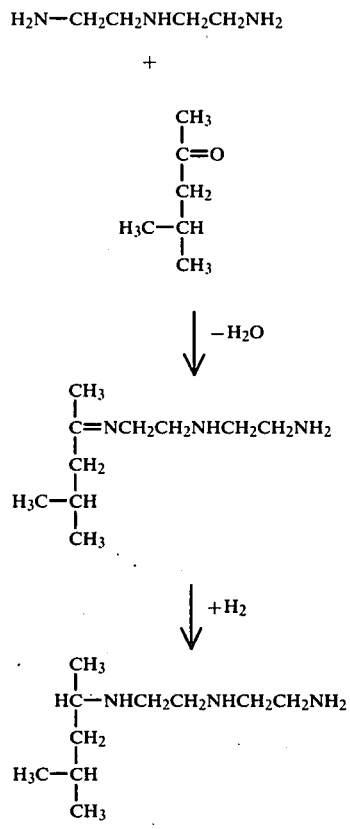

As represented above, there is a monoalkyl substitution wherein the alkyl group is 4-methylhexyl-2. Where at least two moles of ketone are employed, the dialkyl substituted product results. In preparing the dialkyl substituted product, an excess of ketone is employed to ensure reaction to form the dialkyl product. The products, accordingly, have the formula noted earlier above, either monoalkyl or dialkyl substituted dependent on the amount of ketone employed. Intermediate levels may be employed which will provide a mixture of mono- and di-alkyl products. In this manner, the primary amine level of the final product is controlled at a low level, yet a small content may be preserved to increase the rate of cure with epoxy resins, if desired.

The ketimine reaction is generally conducted using an inert solvent, such as benzene or toluene and heating at reflux so that the water of reaction may be continuously removed as an azeotrope. However, the presence of solvent is not essential to the reaction. This will generally be at an azeotrope temperature of about 70°-85° C., dependent on which solvent is employed. The reaction is continued until substantially the theoretical amount of water is removed, i.e. 95% or higher completion. This will generally require from about 3-6 hours. The solvent is then removed and the ketimine product then reduced, preferably by catalytic hydrogenation.

The hydrogenation is generally conducted at a temperature of about 50°-200° C. and, preferably, on the order of 100°-150° C. at which temperature any decomposition is generally minimal. A pressure of about 200-1200 psig, preferably about 900-1000 psig, is employed. At the lower temperatures and pressures, the hydrogenation will take about 15-20 hours while at the higher temperatures and pressures, the hydrogenation is completed in about 8-10 hours. At about 1000 psig and about 150° C., using a Raney nickel catalyst, a time of 8-9 hours is representative.

The catalysts employed are the usual hydrogenation catalysts, palladium, platinum, nickel, copper chromite. The preferred, and most common from a cost standpoint, are the nickel catalysts, such as Raney nickel or nickel on kieselguhr. The amount of catalyst will vary dependent on the specific catalyst and reaction condition employed. In general, at least 0.1% of catalyst based on the amount of ketimine to be hydrogenated will be employed. It is generally not necessary to exceed 5%. With the preferred catalysts, amounts of 0.5-1.5% are employed, more commonly about 0.75-1.0%.

Hydrogenation of ketimines is often conducted in the presence of ammonia, although not absolutely required. The presence of ammonia helps suppress side reactions and to improve purity of the product. Hydrogenation of ketimines also generally brings about a significant reduction in color. Many of the hydrogenation products are essentially colorless.

As indicated earlier, the N-alkyl substituted polyamines of this invention are useful in the curing of epoxy resins, both solid and liquid epoxide resins. In general, the most commonly available epoxy resins are those which are the reaction products of epichlorohydrin and bis(parahydroxyphenyl) propane, "bisphenol A." Such resins have the following theoretical structural formula:

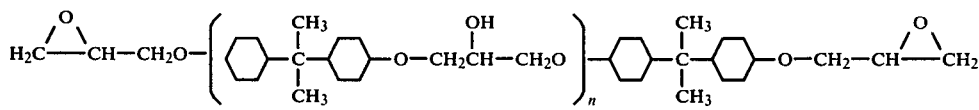

where n is 0 or an integer up to 10. Generally speaking, n will be no greater than 2 or 3, and is preferably 1 or less.

The curing agents of this invention may also be used successfully with aliphatic epoxy resins where the light resistance of the aliphatic epoxy resin is important. One such resin is that prepared from hydrogenated bisphenol A and epichlorohydrin. One such resin currently available has an epoxide equivalent weight or value of 234. Hydrogenated bisphenol A may also be named as 2,2'-di-(4-hydroxycyclohexyl) propane.

Various other types of epoxy resins may be employed. Another of such epoxy resins are those which are the reaction product of epichlorohydrin and bis(-parahydroxyphenyl) sulfone. Still another group of epoxy compounds which may be employed are the glycidyl esters of the polymeric fat acids. These glycidyl esters are obtained by reacting the polymeric fat acids with polyfunctional halohydrins, such as epichlorohydrin. In addition, the glycidyl esters are also commercially available epoxide materials. As the polymeric fat acids are composed largely of dimeric acids, the glycidyl esters thereof may be represented by the following theoretical idealized formula

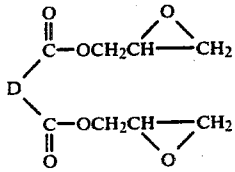

where D is the divalent hydrocarbon radical of dimerized unsaturated fatty acids.

The polymeric fat acids are well-known materials, commercially available, which are the products from the polymerization of unsaturated fatty acids to provide a mixture of dibasic and higher polymeric fat acids. The polymeric fat acids are those resulting from the polymerization of the drying or semi-drying oils or the free acids or the simple aliphatic alcohol esters of such acids. Suitable drying or semi-drying oils include soybean, linseed, tung, perilla, oiticia, cottonseed, corn, sunflower, safflower, dehydrated castor oil and the like. The term "polymeric fat acids" as used herein and as understood in the art, is intended to include the polymerized mixture of acids which usually contain a predominant portion of dimer acids, a small quantity of trimer and higher polymeric fat acids and some residual monomers.

In general, the most readily available naturally occurring poly unsaturated acid available in large quantities is linoleic acid. Accordingly, it should be appreciated that polymeric fat acids will, as a practical matter, result from fatty acid mixtures that contain a preponderance of linoleic acid and will thus generally be composed largely of dimerized linoleic acid. However, polymerized fatty acids may be prepared from the naturally occurring fatty acids having from 16 to 22 carbon atoms and, preferably, those containing 18 carbon atoms. Illustrative thereof are oleic, linolenic, palmitoleic, and the like.

Other types of epoxy resins, which may be cured with the present products and which are commercially available epoxy materials, are the polyglycidyl ethers of tetraphenols which have two hydroxy aryl groups at each end of an aliphatic hydrocarbon chain. These polyglycidyl ethers are obtained by reacting the tetraphenols with polyfunctional halohydrins, such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha, alpha, omega, omega-tetrakis(hydroxyphenyl) alkanes, such as 1,1,2,2-tetrakis(hydroxyphenyl)ethane, 1,1,4,4-tetrakis (hydroxyphenyl)butane, 1,1,4,4-tetrakis(hydroxyphenyl)-2-ethylbutane and the like. The epoxy resin reaction product of epichlorohydrin and tetraphenol may be represented by the following theoretical structural formula:

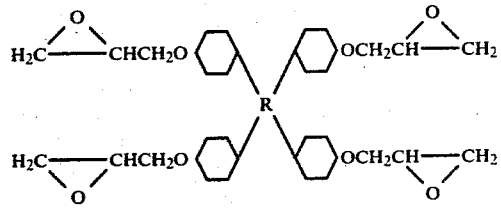

where R is a tetravalent aliphatic hydrocarbon chain having from 2 to 10, and preferably, from 2 to 6, carbon atoms.

Still another group of epoxide materials are the epoxidized novolac resins. Such resins are well-known substances and readily available commercially. The resins may be represented by the following theoretical idealized formula:

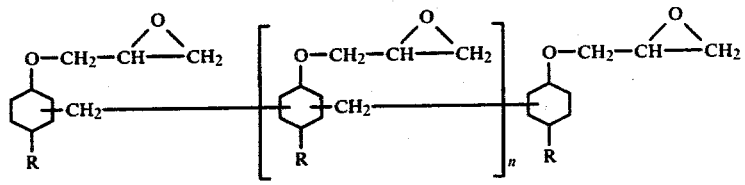

where R is selected from the group consisting of hydrogen and alkyl groups having up to 18 carbon atoms, and n is an integer from 1 to 5. In general, n will be an integer in excess of 1 to about 3.

In general, these resins are obtained by epoxidation of the well-known novolac resins. The novolac resins, as is known in the art, are produced by condensing the phenol with an aldehyde in the presence of an acid catalyst. Although novolac resins from formaldehyde are generally employed, novolac resins from other aldehydes, such as, for example, acetaldehyde, chloral, butyraldehyde, furfural, and the like may also be used. The alkyl group, if present, may have a straight or a branched chain. Illustrative of the alkylphenol from which the novolac resins may be derived are cresol, butyphenol, tertiary butylphenol, tertiary amylphenol, hexylphenol, 2-ethylhexylphenol, nonylphenol, decylphenol, dodecylphenol, and the like. It is generally preferred, but not essential, that the alkyl substituent be linked to the para-carbon atom of the present phenolic nucleus. However, novolac resins in which the alkyl group is in the ortho position have been prepared.

The epoxidized novolac resin is formed in the well-known manner by adding the novolac resins to the epichlorohydrin and then adding an alkali metal hydroxide to the mixture so as to effect the desired condensation reaction.

In addition, other epoxy resins which may be cured with the curing agents of the present invention are the glycidyl ethers of the polyalkylene glycols, epoxidized olefins such as epoxidized polybutadiene and epoxidized cyclohexenes.

In general, the epoxy resins may be described as those having terminal epoxide groups.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy resin equivalent to one epoxy group or one gram equivalent of epoxide. The epoxy resinous materials employed in this invention have an epoxy equivalent weight of from about 140 to about 2,000.

Because the products of the invention, useful as curing agents for epoxy resins, are liquid and have low viscosity, they are particularly suitable for curing liquid epoxy resins for use in applications where liquid resins of low viscosity must be used. The liquid epoxy resins will have epoxy equivalent weights in the range of about 140 to 300. In general, epoxy resins having epoxy equivalent weights above 300 are solid epoxy resins, dependent on the particular class of epoxy resin being employed from those discussed above.

Coatings formulae comprising the N-alkyl substituted polyamines of this invention and epoxy resins may be used with or without added solvent, although normally a small amount of solvent will be present as, for example, in spray applications. The coating systems may be formulated with or without pigments, corrosion inhibitors, flow control agents, anti-fouling additives or other biocides, cure rate modifiers, plasticizers. Other resins, other curing agents, and other modifiers as known to those skilled in the art. Where the systems are used for potting, casting, adhesives, sealants, and laminating agents, fillers may also be added as well as one or more of the modifying agents already mentioned. Sand and/or aggregate may be added for floor covering or repair application. Decorative rock, ceramic, or plastic pieces or chips may be added for tile-like uses or terrazo-like appearance.

The following examples will serve to better illustrate the present invention in which all parts and percentages are by weight unless otherwise indicated.

EXAMPLE 1

In this example, the procedure for making an N-alkyl substituted polyamine through the ketimine route is illustrated. This same general procedure may be followed for other N-alkyl substituted polyamines.

A one liter flask was fitted with a thermometer and with a Stark and Dean distilling head connected with a condenser for removing and separating water formed in the reaction. The flask was charged with 342 g. (3 gram molecules) of methyl isoamyl ketone and 154.5 g. (1.5 gram molecules) of diethylene triamine, or a ratio of one mole ketone for each primary amine group, plus 125 g. benzene. The reaction mixture was heated at reflux while water was continuously removed as azeotrope. The boiling temperature (pot temperature) at the start was 118° C. After 4½ hours, the removal of by-product water had virtually ceased and the volume removed amounted to 52 ml (approximately 96% complete). The boiling temperature was now 123° C. The benzene solvent was removed by means of a flash evaporator at a bath temperature of 93° C. using water pump vacuum (about 60 mm. Hg. pressure).

The ketimine product was hydrogenated as follows: 300 g. of the ketimine product and 24 g. of wet Raney nickel (stored under methanol) were charged to a stirred autoclave made of stainless steel. Hydrogen was admitted to give a pressure of approximately 1000 pounds per square inch. The reaction mixture was stirred and heated at 145° C. until hydrogen uptake was complete. This took 8–9 hours. The catalyst was removed by filtration to give an almost colorless, free-flowing liquid of low viscosity.

EXAMPLE 2

The general procedure described in Example 1 was followed in preparing the N-alkyl substituted polyamines of the following four types:
(1) R—NHCH$_2$CH$_2$NHCH$_2$CH$_2$NH$_2$
(2) R—NHCH$_2$CH$_2$NHCH$_2$CH$_2$NH—R
(3) R—NHCH$_2$CH$_2$NHCH$_2$CH$_2$NH—CH$_2$CH$_2$NH$_2$
(4) R—NHCH$_2$CH$_2$NHCH$_2$CH$_2$NH—CH$_2$CH$_2$NH—R

| Product | Type | R Group | Viscosity (centistokes) | Amine No. |
|---------|------|---------|-------------------------|-----------|
| A | 1 | 4-Methylhexyl-2 | 14 | 764 |
| B | 1 | 4-Methylpentyl-2 | 10 | 863 |
| C | 1 | Hexyl-2 | 6 | 826 |
| D | 2 | 4-Methylhexyl-2 | 6 | 510 |
| E | 2 | 4-Methylpentyl-2 | 6 | 588 |
| F | 2 | Hexyl-2 | 10 | 587 |
| G | 3 | 4-Methylhexyl-2 | 14 | 863 |
| H | 3 | 4-Methylpentyl-2 | 14 | 829 |
| I | 3 | Hexyl-2 | 14 | 857 |
| J | 4 | 4-Methylhexyl-2 | 14 | 546 |
| K | 4 | 4-Methylpentyl-2 | 14 | 633 |
| L | 4 | Hexyl-2 | 6 | 571 |

EXAMPLE 3

Each of the products listed in Example 2 was dissolved in n-butanol to give an 80% solution. These were made into clear coatings by combining, in appropriate quantity, with an 80% solution of a commercial liquid diepoxide made from bisphenol A and epichlorhydrin (of epoxide equivalent weight 182–190 and viscosity at 25° C. of 110–140 poise). The solvent for the diepoxide was made from 15% of methyl isobutyl ketone, 25% methyl ethyl ketone, 15% toluene, and 45% mono ethyl ether of ethylene glycol (all by weight). Coatings were applied to steel and glass plates with a 3 mil coating blade. Coating properties were determined to be as follows:

| Product from Example 2 | Amount* | Gardner-Holdt Viscosity of mixture | | | | Tack Free Time Hrs | Sward Hardness 7 Days | Impact Extension % | Adhesion to Steel |
|---|---|---|---|---|---|---|---|---|---|
| | | Start | 2 Hrs | 4 Hrs | 6 Hrs | | | | |
| A | 27.5 | A | F | V | Z-1 | 6–7 | 65 | 1–2 | Exc. |
| B | 25 | A-1 | K | Y | Z-4 | 5–6 | 54 | 1–2 | Exc. |
| C | 25 | A-1 | K | Y | Z-3 | 6 | 58 | 10–20 | Exc. |
| D | 53 | A-1 | C | H | N | 8 | 71 | 1–2 | Exc. |

-continued

| Product from Example 2 | Amount* | Gardner-Holdt Viscosity of mixture | | | | Tack Free Time Hrs | Sward Hardness 7 Days | Impact Extension % | Adhesion to Steel |
|---|---|---|---|---|---|---|---|---|---|
| | | Start | 2 Hrs | 4 Hrs | 6 Hrs | | | | |
| E | 47.5 | A-1 | H | O | T | 8 | 69 | ½-1 | Exc. |
| F | 47.5 | A-1 | H | L | S | 8 | 58 | 1-2 | Exc. |
| G | 30 | A-1 | Q | Z-1 | Z-4 | 6 | 77 | 1-2 | Exc. |
| H | 26 | A | J | Y | Z-4 | 7-8 | 70 | 1-2 | Exc. |
| I | 26 | A | M | Y | Z-4 | 7-8 | 70 | 2-5 | Exc. |
| J | 47.5 | A | B | H | N | 8 | 71 | 1-2 | Exc. |
| K | 45 | A | D | I | Q | 8 | 72 | 1-2 | Exc. |
| L | 45 | A-1 | C | K | P | 8 | 67 | 2-5 | Exc. |

*Parts Alkyl Polyamine per 100 parts diepoxide by weight.

EXAMPLE 4

Some of the coating compositions described in Example 3 were allowed to cure at room temperature for seven days and then tested for resistance to solvents and chemicals. The test was performed by placing the solvent or chemical in contact with the coating film for 24 hours and then examining for damage.

RESISTANCE TESTS

Coating From Curing Agent Product As Shown in Example 3

| | A | B | C | D | E | G |
|---|---|---|---|---|---|---|
| Water | OK | OK | OK | OK | OK | OK |
| 20% NaOH | OK | OK | OK | OK | OK | OK |
| 37% H$_2$SO$_4$ | Sl E | Sl E | Sl E | Sl E | Sl E | Sl E |
| Mineral Spirits | OK | OK | OK | OK | OK | OK |
| Toluene | S | S | S | L | L | S |
| Oleic Acid | OK | OK | OK | S | S | OK |
| 5% Acetic Acid | L | S | L | L | L | L |
| 50% Ethanol | Sl S | OK | OK | S | S | Sl S |
| Acetone | S | S | S | S | S | S |

Code:
E = Etched
S = Softened
L = Loosened or removed
OK = Hard
Sl = Slightly

EXAMPLE 5

An 80% solution of epoxy resin as described in Example 3 was combined with rutile titanium dioxide at a ratio by weight of 100 of epoxy resin solution to 83 of the titanium dioxide and then ground in a ball mill to a fineness of 6.5, North standard. To this was added 53 parts by weight of an 80% solution in butanol of curing agent polyamine D (of Example 2). The viscosity as measured in Ford Cup #4 was 23.5 seconds. Coatings were applied to steel and glass plates with a 3 mil coating blade. They were allowed to cure for one week.

Sward Hardness—47
60° Gloss—98.8

EXAMPLE 6

This example will serve to illustrate the formation of a glycidyl or monoepoxide compound with the N-(mono)alkyl polyamine to form an adduct which is also useful for curing epoxy resins. The adduction with the monoepoxide provides for improvement in film flexibility with small sacrifice in drying or curing rate with epoxy resin.

A one liter, 3-neck reaction flask was charged with 300 g. of the alkyl amine B of Example 2, 171 g. of the glycidyl ether of predominantly C-12 and C-14 aliphatic alcohol mixture, having an oxirane oxygen content of 5.6%, and 0.5 g. of p-toluenesulfonic acid monohydrate. The reaction mixture was stirred and heated at 60°-70° C. under a nitrogen atmosphere for 2 hours. A clear, pale yellow liquid was obtained.

This adduct was formulated into a coating using the epoxy resin of Example 3 and the same solvent as given in Example 3. The formula was as follows:

adduct curing agent—41 pbw
epoxy resin—90 pbw
solvent blend—31 pbw

Films were cast with a 3 mil coating blade and allowed to cure at 73° F. and 50% relative humidity. Slightly more than 8 hours but less than 18 hours was needed to become tack free. They were clear and smooth. After 7 days cure the Sward hardness was 60 and the impact-extension value was >60%.

The foregoing illustrates the use of monoepoxides having relatively long carbon chains of up to 14 carbon atoms. In addition to the glycidyl ethers of the alcohols above, other monoepoxides can be employed having from 2-20 carbon atoms. Suitable aliphatic monoepoxides for preparing the adduct include ethylene oxide, butylene oxide, 1,3-propylene oxide, 1,2-propylene oxide, 1,2-epoxy-3-butene. etc. In addition, the aliphatic monoepoxides may contain aromatic substituents. Preferably aliphatic monoepoxides containing aromatic substituents are styrene oxide, phenylglycidyl ether and cresylglycidyl ether.

When a monoalkyl polyamine is so modified by a monoepoxide, the second R group in the formula for the curing agents of this invention may, accordingly, be one which may contain an 0 atom from the ether linkage of the glycidyl ether and/or be substituted with an OH, hydroxyl group, which results from opening of the oxirane ring of the monoepoxide or the alcoholic hydroxyl group. In addition, the carbon atom range may be from 2 to 14 carbon atoms rather than limited to the range set forth for R above. In this manner R can thus be R" when R" is defined as an aliphatic hydrocarbon radical containing from 2 to 14 carbon atoms which may further (a) contain an Oxygen atom therein, (b) contain a hydroxyl substituent or an aromatic substituent such as a phenyl ring. In forming the adduct, the monoepoxide would generally be employed in an amount to adduct with the remaining primary amine groups and, accordingly, would be used in an amount of one mole per mole of N-monoalkyl substituted polyamines.

EXAMPLE 7

In this instance, an epoxy resin made from hydrogenated bisphenol A and epichlorhydrin having an epoxide equivalent of 234 was employed. Hydrogenated bisphenol A may also be named as 2,2'-di-(4-hydroxycyclohexyl) propane.

The formula, in terms of parts by weight was as follows:
- 22 curing agent-alkyl amine B of Example 2
- 100 epoxy resin as just described in preceding paragraph
- 31 n-butanol
- 2 p-toluene sulfonic acid monohydrate Tack free time of films cured at 73° F. and 50% relative humidity—21 hours.

After 7 days cure under these same conditions, for films cast with 3 mil blade

| | |
|---|---|
| Sward Hardness | 29 |
| Impact extension | >60% |
| Appearance | clear and smooth, with excellent adhesion |

When the amount of the same alkyl amine was increased to 30 pbw the film became hard more quickly [Sward value 46 in 7 days] but the impact-extension value was reduced to 1–2%.

EXAMPLE 8

The diketimine of methyl isobutyl ketone and diethylene triamine was prepared as follows. A two-liter, three-neck flask was charged with 10 moles (1000 grams) of methyl isobutyl ketone and 2.5 moles (257.5 grams) of diethylene triamine. The mixture was stirred and heated to reflux and the by-product water removed as an azeotrope distillate with the excess ketone using a water separator. After approximately five hours, essentially the theoretical amount of by-product water had been obtained and the pot temperature was 126° C. The excess ketone was then removed at hot water bath temperature by vacuum evaporation using a rotary flask evaporator. The recovered product weighed 670 grams. The calculated yield was 667.5 grams, indicating that a very small amount of the excess ketone remained.

EXAMPLE 9

As noted earlier, Amine ODT, subsequently also called Santomerse DT, is a 12 carbon atom aliphatic chain substituted diethylene triamine. In order to illustrate the properties thereof, Santomerse DT (amine number of 532) was used to cure an epoxy resin of bisphenol A and epichlorhydrin (ERL 2795) having an epoxide equivalent weight of about 185. The results can be seen from the following data

| | Mixture by Weight | | | Viscosity | |
|---|---|---|---|---|---|
| Mix No. | ERL 2795 | Santo-merse D.T. | D.E.T. | Fresh Mix | 2 Hrs. Later |
| 1 | 65 | 35 | | E | U |
| 2 | 70 | 30 | | E | T |
| 3 | 75 | 25 | | F | R |
| 4 | 90 | | 10 | H | Gel |

| | RESISTANCE TESTS | | | |
|---|---|---|---|---|
| | 7 Day Cure | 1 Day Cure | | |
| Mix No. | Mineral Spirits | Oleic Acid | 20% NaOH | 37% H$_2$SO$_4$ |
| 1 | S | L | OK | OK |
| 2 | OK | L | OK | OK |
| 3 | OK | L | OK | OK |
| 4 | OK | L | S | OK |

Code:
S = Softened
L = Loosened or removed
OK = Hard

EXAMPLE 10

In order to evaluate products having a shorter chain than the 12 carbon atoms of Example 9, products of polyamine types 1 and 2 were prepared in the same manner as Example 2 wherein the R group was nonyl 2. Type 1 designated M had an amine number of 668 while type 2 designated N had an amine number of 482. Both were used to cure an epoxy resin in the same manner as Example 3 using the same epoxy resin as in Example 3. Product M was employed at 30 parts, and product N at 62 parts, per 100 parts diepoxide by weight. Product m spewed on curing at room temperature at 50% relative humidity while product N gave a soft film, too soft to check some of the properties. "Spew" is sometimes referred to as "greasy exudate" or "greasy bloom" and is undesirable in that the surface has an undesirable feel, attracts dust and dirt and will darken readily.

EXAMPLE 11

Reference was made earlier to a monotertiary-diprimary triamine of U.S. Pat. No. 3,280,074. Such a product having the formula RN(CH$_2$CH$_2$CH$_2$NH$_2$)$_2$ where R is a tallow acid radical was used to cure an epoxy resin along with curing agent B of Example 2. The results can be seen as follows, in which the ratios of curing agent and epoxy resin are used in the approximate ratio of one amino hydrogen per one epoxy group.

| | Formula I | Formula II |
|---|---|---|
| Epoxy resin from reaction of hydrogenated bisphenol A and epichlorhydrin, equivalent weight 234 | 10 g. | 10 g. |
| XC-95 | 4. g. | 0 g. |
| Curing Agent "B" | 0 g. | 2.2 g. |
| Butanol | 2 g. | 2 g. |
| p-toluene sulfonic acid monohydrate accelerator | 0.2 g | 0.2 g. |
| FC-430 flow control additive | 0.05g. | 0.05g. |

Both mixes were stored for one hour and then films applied to panels with a 3 mil coating blade. The films were allowed to stand or cure in a room held at 72° F. and 50% relative humidity. The coating from Formula II became tack free (to aluminum foil) in less than 24 hours while the coating from Formula I was still tacky after five days.

The embodiments of the invention in which an exclusive property or privilege is claimed are defined as follows:

1. A composition comprising the reaction product of an epoxy resin having terminal epoxide group and an N-alkyl polyamine of the formula $$R-[NH(CH_2)_x]_y-NHR'$$

where R is an aliphatic hydrocarbon radical having from 5–8 carbon atoms, x is an integer of 2 or 3, y is an integer of 2–4 and R' is H, R or R'' where R'' is an aliphatic hydrocarbon substituent having 2–14 carbon atoms with the proviso that R'' may
   (a) contain an oxygen atom in the chain
   (b) contain a hydroxyl substituent
   (c) contain a phenyl substituent, or
   (d) contain any combination of (a), (b) and (c).

2. A composition as defined in claim 1 wherein said epoxy resin has an epoxy equivalent weight of from about 140 to 2000.

3. A composition as defined in claim 1 wherein said epoxy resin has an epoxy equivalent weight of about 140 to 300.

4. A composition as defined in claim 1 wherein the epoxy resin is a polyglycidyl ether of dihydric phenol.

5. A composition as defined in claim 1 wherein R is 4-methylpentyl-2.

6. A composition as defined in claim 1 wherein R is 4-methylhexyl-2.

7. A composition as defined in claim 1 wherein R is hexyl-2.

8. A process of curing an epoxy resin having terminal 1,2-epoxide groups comprising mixing said epoxy resin with an N-alkyl polyamine of the formula $$R-[NH(CH_2)_x]_y-NHR'$$

where R is an aliphatic hydrocarbon radical having from 5–8 carbon atoms, x is an integer of 2 or 3, y is an integer of 2–4 and R' is H, R or R'' where R'' is an aliphatic hydrocarbon substituent having 2–14 carbon atoms with the proviso that R'' may
   (a) contain an oxygen atom in the chain
   (b) contain a hydroxyl substituent
   (c) contain a phenyl substituent, or
   (d) contain any combination of (a), (b) and (c).

* * * * *